US012570239B2

(12) United States Patent
Zeller

(10) Patent No.: US 12,570,239 B2
(45) Date of Patent: Mar. 10, 2026

(54) SECURITY SYSTEM FOR A VEHICLE

(71) Applicant: Honda Motor Co., Ltd., Tokyo (JP)

(72) Inventor: Joel C. Zeller, Marysville, OH (US)

(73) Assignee: Honda Motor Co., Ltd., Tokyo (JP)

( * ) Notice: Subject to any disclaimer, the term of this patent is extended or adjusted under 35 U.S.C. 154(b) by 50 days.

(21) Appl. No.: 18/612,711

(22) Filed: Mar. 21, 2024

(65) Prior Publication Data

US 2025/0296531 A1 Sep. 25, 2025

(51) Int. Cl.
B60R 25/31 (2013.01)
B60R 25/104 (2013.01)
B60R 25/24 (2013.01)

(52) U.S. Cl.
CPC ............ B60R 25/31 (2013.01); B60R 25/104 (2013.01); B60R 25/245 (2013.01); B60R 2325/205 (2013.01)

(58) Field of Classification Search
CPC ..... B60R 25/31; B60R 25/104; B60R 25/245; B60R 2325/205
See application file for complete search history.

(56) References Cited

U.S. PATENT DOCUMENTS

| | | | |
|---|---|---|---|
| RE38,378 E | 1/2004 | Montague | |
| 7,535,345 B2 * | 5/2009 | Tanaka ................ | B60R 25/1004 200/52 A |

| | | | |
|---|---|---|---|
| 7,598,847 B2 | 10/2009 | Fukagawa et al. | |
| 9,862,424 B2 | 1/2018 | Yamamoto | |
| 2016/0272035 A1 * | 9/2016 | Oishi .................. | B60G 17/017 |
| 2021/0358236 A1 * | 11/2021 | Sekiya ................ | H04B 17/318 |
| 2023/0063348 A1 * | 3/2023 | Jo ....................... | B60C 23/0481 |
| 2023/0251372 A1 * | 8/2023 | Van Wiemeersch .... | G01S 13/08 342/118 |
| 2023/0256909 A1 * | 8/2023 | Salter ....................... | B60R 3/02 280/166 |
| 2023/0373440 A1 * | 11/2023 | Cheikh ................ | B60R 25/245 |

FOREIGN PATENT DOCUMENTS

| | | |
|---|---|---|
| CN | 101665109 B | 9/2011 |
| CN | 205326709 U | 6/2016 |
| CN | 112172738 A | 1/2021 |
| CN | 112172947 B | 1/2022 |
| DE | 102016210546 A1 | 12/2017 |
| JP | H05112207 A | 5/1993 |
| KR | 20090108921 B1 | 10/2009 |
| KR | 20160030723 A | 3/2016 |

* cited by examiner

*Primary Examiner* — Thomas D Alunkal
(74) *Attorney, Agent, or Firm* — Andrew Kefalonitis, Jr.; American Honda Motor Co., Inc.

(57) ABSTRACT

A security system for a vehicle includes at least one ultra-wide band sensor configured to be mounted to the vehicle, to detect a presence of an authorization device in a vicinity of the vehicle, and to monitor a height of the vehicle from a ground surface, wherein the authorization device enables a user to access the vehicle.

11 Claims, 2 Drawing Sheets

SECURITY SYSTEM FOR A VEHICLE

BACKGROUND

The disclosed subject matter relates generally to a vehicle. More particularly, the disclosed subject matter relates to a security system for a vehicle.

Current anti-theft systems of the vehicles are generally configured to prevent theft of entire vehicles. However, these systems generally either provide no or limited protection against theft of parts of the vehicles, for example, wheels/tires, catalytic converters, etc., which is undesirable.

SUMMARY

In accordance with one embodiment of the present disclosure, a security system for a vehicle is provided. The security system comprises at least one ultrawide band sensor configured to be mounted to the vehicle, to detect a presence of an authorization device in a vicinity of the vehicle, and to monitor a height of the vehicle from a ground surface, wherein the authorization device enables a user to access the vehicle.

In accordance with another embodiment of the present disclosure, a vehicle is provided. The vehicle comprises a vehicle access control system configured to allow authorized users to access an interior of the vehicle based at least partially on detection of an authorization device. The vehicle also includes at least one ultrawide band sensor coupled to a portion of the vehicle and configured to detect a presence of the authorization device in a vicinity of the vehicle and to monitor a height of the ultrawide band sensor relative to a ground surface.

In accordance with yet a further embodiment of the present disclosure a method for monitoring a vehicle is provided. The method comprises monitoring, by at least one ultrawide band sensor, a distance of an underbody of the vehicle from a ground surface, and monitoring, by the at least one ultrawide band sensor, a presence of an authorization device in a vicinity of the vehicle. The authorization device enables an access of the vehicle. The method further includes determining, by a controller, a change in the distance of the underbody of the vehicle, when the vehicle is parked, and the presence of the authorization device in the vicinity of the vehicle based on an input from the at least one ultrawide band sensor.

BRIEF DESCRIPTION OF THE DRAWINGS

Certain embodiments of the present disclosure will be better understood from the following description taken in conjunction with the accompanying drawings in which.

DETAILED DESCRIPTION OF EXEMPLARY EMBODIMENTS

A few inventive aspects of the disclosed embodiments are explained in detail below with reference to the various figures. Exemplary embodiments are described to illustrate the disclosed subject matter, not to limit its scope, which is defined by the claims. Those of ordinary skill in the art will recognize a number of equivalent variations of the various features provided in the description that follows. Embodiments are hereinafter described in detail in connection with the views and examples of FIGS. 1-2, wherein like numbers indicate the same or corresponding elements throughout the views.

Figure 1:
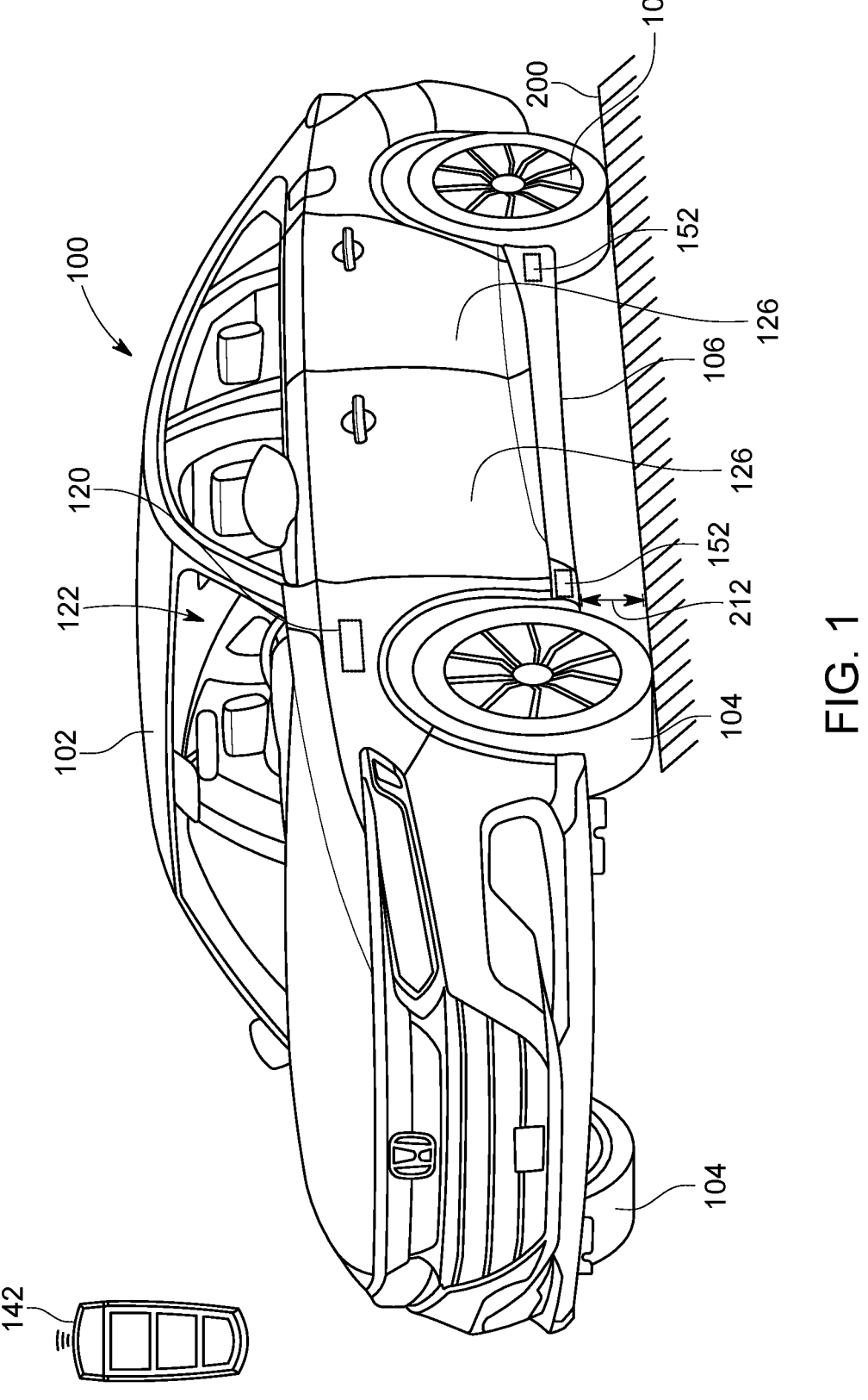
FIG. 1 is a side perspective view of a vehicle, in accordance with one embodiment of the present disclosure.

FIG. 1 illustrates a side perspective view of a vehicle, indicated generally at 100, in accordance with one embodiment of the present disclosure. The vehicle 100 is shown as a sedan. However, vehicle 100 in accordance with alternative embodiments can comprise any variety of vehicles, including trucks, vans, recreational vehicles, utility vehicles, agricultural equipment, or construction equipment, for example. The vehicle 100 includes a vehicle body 102 to which various components of the vehicle 100 are mounted, and a plurality of traction members 104, for example, wheels 104, movably supporting the vehicle body 102 on a ground surface 200. It may be appreciated that the vehicle body 102 includes an underbody 106 arranged facing the ground surface 200.

Figure 2:
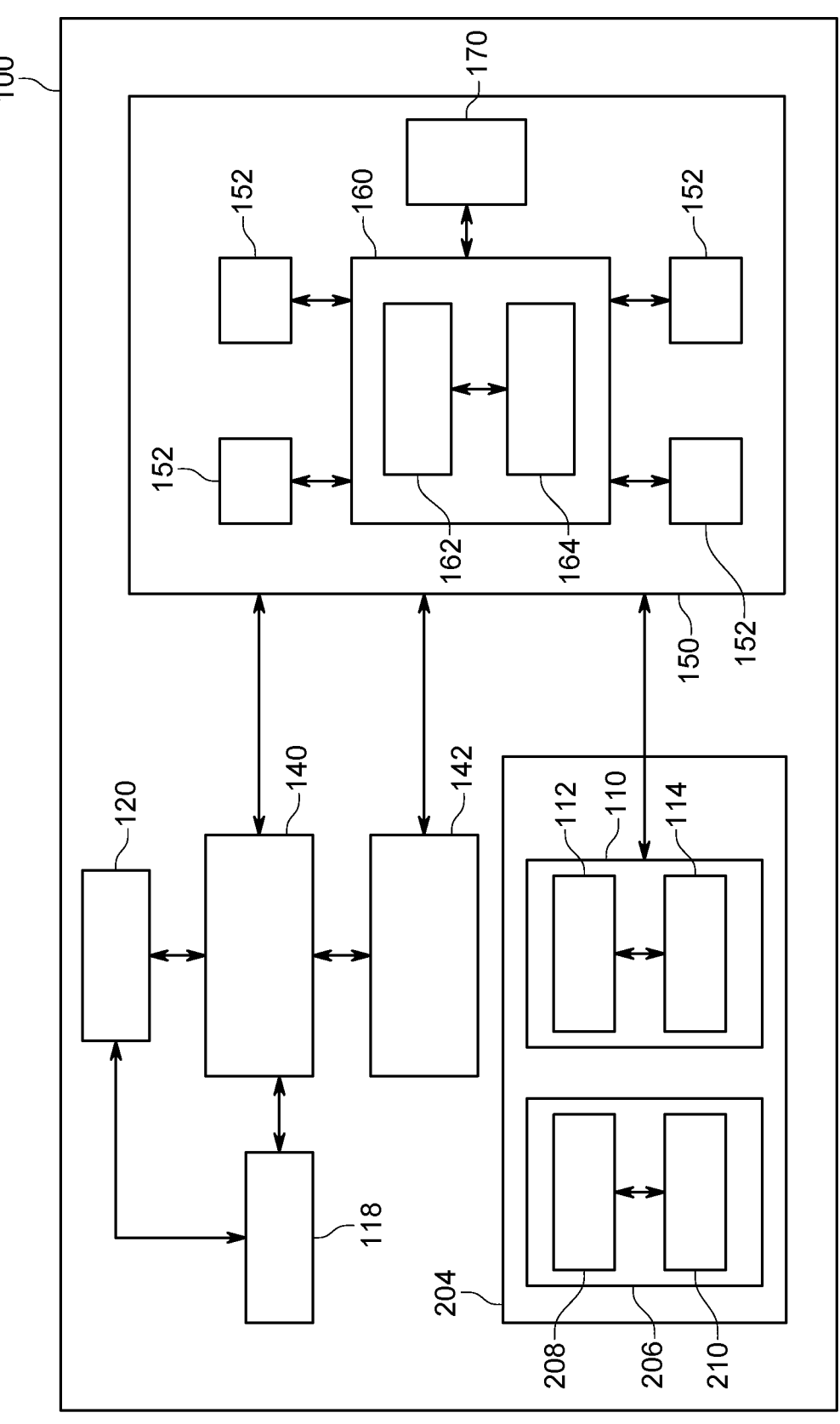
FIG. 2 is a block diagram of the vehicle of FIG. 1 and schematically depicting various components of the vehicle, in accordance with one embodiment of the present disclosure.

Moreover, referring to FIG. 2, the vehicle 100 includes a parking system 204 configured to maintain the vehicle 100 in a stationary position. Parking system 204 may include a braking system 110 and/or a park gear 206. For example, braking system 110 applies braking force to one or more wheels 104 of the vehicle 100 to slow down and/or stop the vehicle 100. The braking system 110 may include a parking brake 112 applied to hold the wheels 104 in a non-rotating state (i.e., preventing the vehicle 100 from moving). In some embodiments, the braking system 110 may include a parking brake actuator 114 to enable the actuation of the parking brake 112. It may be appreciated that the parking brake 112 is applied upon parking of the vehicle 100 either automatically or manually by a user to keep the vehicle 100 stationary. Moreover, the park gear 206 may include a gear selector 208 that includes a park selection. When the user selects the park selection, a parking pawl 210 may be engaged with a portion of a vehicle output shaft (not shown) associated with a power source 120 of the vehicle 100. In alternative embodiments, when the user selects the park selection, the parking brake 112 may be activated. In additional alternative embodiments, the vehicle 100 may be configured to automatically select the park selection when the vehicle speed is zero for a predefined length of time. Further, the vehicle 100 may include a start switch 118 adapted to be arranged at ON position or OFF position. A power source 120, for example, the engine or the traction motor, of the vehicle 100 is started when the switch 118 is arranged at ON position, while at the OFF position, the power source 120 is stopped.

Moreover, referring again to FIG. 1, the vehicle body 102 defines a passenger compartment 122 and a plurality of access openings, for example, two side front access openings and two side rear access openings, to enable an entry and exit of the passenger from the passenger compartment 122. Additionally, the vehicle 100 includes a plurality of side doors 126 movably attached to the vehicle body 102 for selectively closing the plurality of access openings.

Also, referring to FIG. 2, to enable access to an interior of the vehicle 100 i.e., passenger compartment 122 of the vehicle 100 and locking/unlocking of the one or more doors 126 of the vehicle 100, the vehicle 100 includes a vehicle access control system 140. Further, the vehicle access control system 140 is arranged in communication with the switch 118 to enable or disable the starting of the power source 120. Accordingly, the vehicle access control system 140 is configured to authenticate the identity of a user and determine whether the user is allowed to access the interior of the vehicle 100 and start the power source 120. Moreover, the vehicle access control system 140 is configured to enable the unlocking and/or opening of the doors 126 and starting of the vehicle 100 when the user is authenticated. In an embodiment, the vehicle access control system 140 includes an authorization device 142 that facilitates the authentication of the user. It may be appreciated that unlocking and/or opening of the doors 126 and the starting of the power source 120 is enabled when the authorization device 142 is within a vicinity of the vehicle 100. The authorization device 142 is configured to facilitate the authentication of the user by sharing or transmitting an authentication signal/message/ data to the vehicle 100. In an embodiment, the authorization device 142 is a keyfob associated with the vehicle 100 and/or a smart phone having necessary software associated with the vehicle 100. It may be appreciated that the vehicle 100 may store one or more authentication codes associated with one or more authorization devices 142 and provides access of the interior of vehicle and starting of the vehicle 100 when received authentication code from the authorization device 142 matches with any one of the stored authentication codes. In some embodiments, the authorization device 142 may include a transceiver that enables a radio frequency based short range communication between the authorization device 142 and the vehicle 100.

Further, the vehicle 100 includes a security system 150 to monitor the vehicle 100 to prevent a theft of the vehicle 100 and/or a portion of the vehicle 100 when the vehicle 100 is parked. For example, the security system 150 described herein prevents stealing the vehicle 100 and/or stealing of parts of the vehicle, such as, but not limited to, wheels, catalytic converter, etc., for which the vehicle needs to be lifted. In the exemplary embodiment, the security system 150 includes at least one ultrawide band sensor 152 mounted to the vehicle 100, for example, coupled to the underbody 106 of the vehicle 100 and configured to monitor a height 212 of the vehicle 100 i.e., a distance of the underbody 106 of the vehicle 100 from the ground surface 200 or a height of the at least one ultrawide band sensor 152 from the ground surface 200. In an embodiment, the at least one ultrawide band sensor 152 may include a plurality of ultrawide band sensors arranged at various locations of the vehicle 100 for example, proximate to the wheels 104 of the vehicle 100. In such a case, a height/distance of the underbody 106 of the vehicle 100 from the ground surface 200 or the height/distance of the ultrawide band sensor 152 is measured based on the input received from all the sensors 152 or some combination of all of the sensors 152.

Further, the at least one ultrawide band sensor 152 is also configured to facilitate a detection of a presence or absence of the authorization device 142 in the vicinity of the vehicle 100. In some embodiments, the at least one ultrawide band sensor 152 is configured to receive the radio frequency signal/message/code emitted by the authorization device 142 to enable the detection of the presence of the authorization device 142 in the vicinity of the vehicle 100. In some embodiments, at least one ultrawide band sensor 152 is configured to communicate with the authorization device 142 and detect the authorization device 142 only when the authorization device 142 is within a predefined distance from the vehicle 100.

Further, the security system 150 includes a controller 160 communicatively coupled to the at least one ultrawide band sensor 152, the vehicle access control system 140, the braking system 110, the start switch 118, and/or any other electrical and electronic system or component of the vehicle 100. In some embodiments, the controller 160 may be an electronic control module (ECM) of the vehicle 100. The controller 160 includes a processor 162 and a memory 164 to respectively process and store the data received from the at least one ultrawide band sensor 152 and other electrical and electronic component of the vehicle 100. In some embodiments, the instructions to process the data received from the at least one ultrawide band sensor 152 and the authorization device 142 is stored inside the memory 164 of the controller 160.

The memory 164 may be integrated into the controller 160, but those skilled in the art will understand that the memory 164 may be separate from the controller 160 but onboard the vehicle 100, and/or remote from the controller 160 and the vehicle 100, while still being associated with and accessible by the controller 160 to store information in and retrieve information from the memory 164 as necessary during the operation of the vehicle 100 i.e., the security system 150 and the vehicle access control system 140. Although the processor 162 is contemplated, it is also possible and contemplated to use other electronic components such as a microcontroller, an application specific integrated circuit (ASIC) chip, or any other integrated circuit device. The processor 162 is configured to execute specified instructions, which controls and monitors various functions associated with braking system 110, the security system 150, the vehicle access control system 150 and its components, etc.

Further, the processor 162 is also configured to monitor the presence of the authorization device 142 in the vicinity of the vehicle 100 based on an input received from the at least one ultrawide band sensor 152. For so doing, in some embodiments, the sensor 152 is configured to receive the message/signal/data from the authorization device 142 and shares the data with processor 162 for further processing. The processor 162 may compare the message or data or signal received from the authorization device 142 with prestored one or more authorization data stored inside the memory 164. The processor 162 is configured to determine the presence of the authorization device 142 in the vicinity of the vehicle when the message or data or signal received from the authorization device 142 matches with the prestored data, else the processor 162 determines the absence of the authorization device 142 in the vicinity of the vehicle 100. In some embodiments, the processor 162 may also determine the absence of the authorization device 142 in the vicinity of the vehicle 100 if no data, associated with the authorization device 142, is received by the ultrawide band sensor 152.

In some embodiments, the at least one ultrawide band sensor 152 is paired with the authorization device 142, and the authorization device 142 may relay data to the at least one ultrawide band sensor 152 in response to a predetermined/predefined signal/data from the ultrawide band sensor 152. In such a case, the processor 162 may determine the presence or absence of the authorization device 142 in response to the receipt or non-receipt of such predefined/ predetermined data from the authorization device 142. Upon determination of the presence of the authorization device 142 in the vicinity of the vehicle 100, the controller 160 i.e., the processor 162 communicates such information with the vehicle access control system 140. Upon receipt of the information of the presence of the authorization device 142 in the vicinity of the vehicle 100, the vehicle control system unlocks the doors 126 of the vehicle 100 to enable a user to access the interior of the vehicle 100. Also, the vehicle access control system 140 may enable the start switch 118 to facilitate the starting of the power source 120 in response to the input of the user when the authorization device 142 is in the vicinity of the vehicle 100. Accordingly, the vehicle access control system 140 disables the starting of the power source when the absence of the authorization device 142 is determined in the vicinity of the vehicle 100.

In some embodiments, the processor 162 may also determine a distance of the authorization device 142 from the vehicle 100 based on the data received from the authorization device 142. For example, the ultrawide band sensor 152 may determine the distance based on time duration between a signal shared/sent by the ultrawide band sensor 152 and a response received from the authorization device 142. It may be appreciated that the method of determination of the distance between the ultrawide band sensor 152 and the authorization device 142 based on the input received from the ultrawide band sensor 152 is known in the art.

In the embodiments, the processor 162 is configured to determine a parking of the vehicle 100 based on an input received from the parking system 204. For example, the processor 162 may determine the vehicle 100 is parked based on a park selection from the gear selector 208 and/or a signal from the parking brake actuator 114. Also, the processor 162 is configured to determine, based on input received from the at least one ultrawide band sensor, a distance/height of the underbody 106 or the at least one ultrawide band sensor 152 of the vehicle 100 from the ground surface 200. It may be appreciated that the processor 162 stores the initially measure distance, upon parking of the vehicle 100, as a first distance value/a first height. Thereafter, the processor 162 keeps monitoring a distance or height of the underbody 106 or the at last one ultrawide band sensor 152 from the ground surface 200, while the vehicle 100 is parked. The processor 162 may monitor the distance constantly, periodically, or intermittently. The processor 162 is configured to generate an alert when the distance of underbody 106 or the height of the at least one ultrawide band sensor 152 changes from the first distance or first height by more than or equal to a predefined value. In some embodiment, the vehicle 100 may include an alert device 170 adapted to be actuated by the processor 162 to generate the alert. In some embodiments, the alert device 170 may be audio alarm, for example, a horn and/or a visual alarm, for example, a light. In some embodiments, the processor 162 is configured to send/share a notification, for example, a text message, to a smart phone associated with a user, for example, an owner, of the vehicle 100 as an alert. Additionally, in some embodiments, before generating the alert, the processor 162 may determine a presence or absence of the authorization device 142 in the vicinity of the vehicle and generate the alert if the absence of the authorization device 142 is determined or the distance of the authorization device 142 from the vehicle 100 is beyond/above the predefined distance. Accordingly, the security system 150 of the present disclosure prevents the stealing of the parts of the vehicle, such as, but not limited to, wheels, catalytic converter, etc., for which the vehicle needs to be lifted. Moreover, as the ultrawide band sensor 152 is used to both determine the lifting of the vehicle 100 as well as communicate with the authorization device 142, an overall cost reduction is achieved as a single type of sensor is used for both functions.

The foregoing description of embodiments and examples has been presented for purposes of illustration and description. It is not intended to be exhaustive or to limit the disclosure to the forms described. Numerous modifications are possible in light of the above teachings. Some of those modifications have been discussed and others will be understood by those skilled in the art. The embodiments were chosen and described in order to best illustrate certain principles and various embodiments as are suited to the particular use contemplated. The scope of the disclosure is, of course, not limited to the examples or embodiments set forth herein, but can be employed in any number of applications and equivalent devices by those of ordinary skill in the art. Rather it is hereby intended that the scope of the disclosure be defined by the claims appended hereto.

What is claimed is:

1. A security system for a vehicle, the security system comprising:
   an ultrawide band sensor mounted to an underbody portion of the vehicle, the ultrawide band sensor configured both to communicate with an authorization device, and to determine a distance between the vehicle and a ground surface by transmitting ultrawide band pulses toward the ground surface and detecting reflections therefrom, wherein the authorization device facilitates authentication of a user and enables the user to access an interior of the vehicle; and
   a controller communicatively coupled to the ultrawide band sensor and configured to:
      determine a first distance value corresponding to the distance between the vehicle and the ground surface upon parking of the vehicle,
      monitor the distance between the vehicle and the ground surface,
      determine a presence of the authorization device in the vicinity of the vehicle based on input from the ultrawide band sensor, and
      generate an alert when the authorization device is not present in the vicinity of the vehicle and the distance between the underbody of the vehicle and the ground surface changes more than a predefined value from the first distance value.

2. The security system of claim 1, wherein the controller is configured to:
   determine a distance between the authorization device and the vehicle based on an input from the ultrawide band sensor, and
   generate the alert when the distance between the authorization device and the vehicle is greater than a predefined distance.

3. The security system of claim 1, wherein the authorization device is at least one of a keyfob and a smart phone.

4. The security system of claim 1, wherein the alert is at least one of an audio alert, a visual alert, and a notification shared to a smart phone.

5. A vehicle comprising:
   a vehicle access control system configured to allow authorized users to access an interior of the vehicle based at least partially on detection of an authorization device;
   an ultrawide band sensor mounted to an underbody portion of the vehicle and configured both to communicate with the authorization device and to monitor a height of the vehicle relative to the ground surface by transmitting UWB pulses toward the ground surface and detecting reflections therefrom; and
   a controller communicatively coupled to the ultrawide band sensor and configured to:
      determine a first height of the vehicle relative to the ground surface upon parking of the vehicle based on input received from the ultrawide band sensor,
      monitor the height of the vehicle relative to the ground surface,

determine a presence of the authorization device in the vicinity of the vehicle based on input from the ultrawide band sensor, and generate an alert when the authorization device is not present in the vicinity of the vehicle and the height of the vehicle relative to the ground surface changes more than a predefined amount from the first height.

6. The vehicle system of claim 5, wherein the controller is configured to:

determine a distance between the authorization device and the vehicle based on an input from the ultrawide band sensor, and generate the alert when the distance between the authorization device and the vehicle is above a predefined distance.

7. The vehicle system of claim 5, wherein the authorization device is at least one of a keyfob and a smart phone.

8. The vehicle system of claim 5, wherein the alert is at least one of an audio alert, a visual alert, and a notification shared to a smart phone.

9. A method for monitoring a vehicle, the method comprising:

monitoring, by an ultrawide band sensor mounted to an underbody portion of the vehicle, a distance between the underbody of the vehicle and a ground surface by transmitting ultrawide band pulses toward the ground surface and detecting reflections therefrom;

monitoring, by the same ultrawide band sensor, for a presence of an authorization device in a vicinity of the vehicle, wherein the authorization device enables an authorized user to access an interior of the vehicle;

determining, by a controller, a change in the distance of between the underbody of the vehicle and the ground surface, when the vehicle is parked; and generating, by the controller, an alert when the change in the distance between the underbody of the vehicle and the ground surface is above a predefined value and the authorization device is not in the vicinity of the vehicle.

10. The method of claim 9, wherein generating the alert includes:

determining, by the controller, a distance between the authorization device and the vehicle based on the input from the ultrawide band sensor, wherein the controller generates the alert when the distance between the authorization device and the vehicle is above a predefined distance.

11. The method of claim 9, wherein the alert is at least one of an audio alert, a visual alert, and a notification shared to a smartphone.

* * * * *